J. L. HEWES.
Machines for Making Gear-Wheel Patterns.

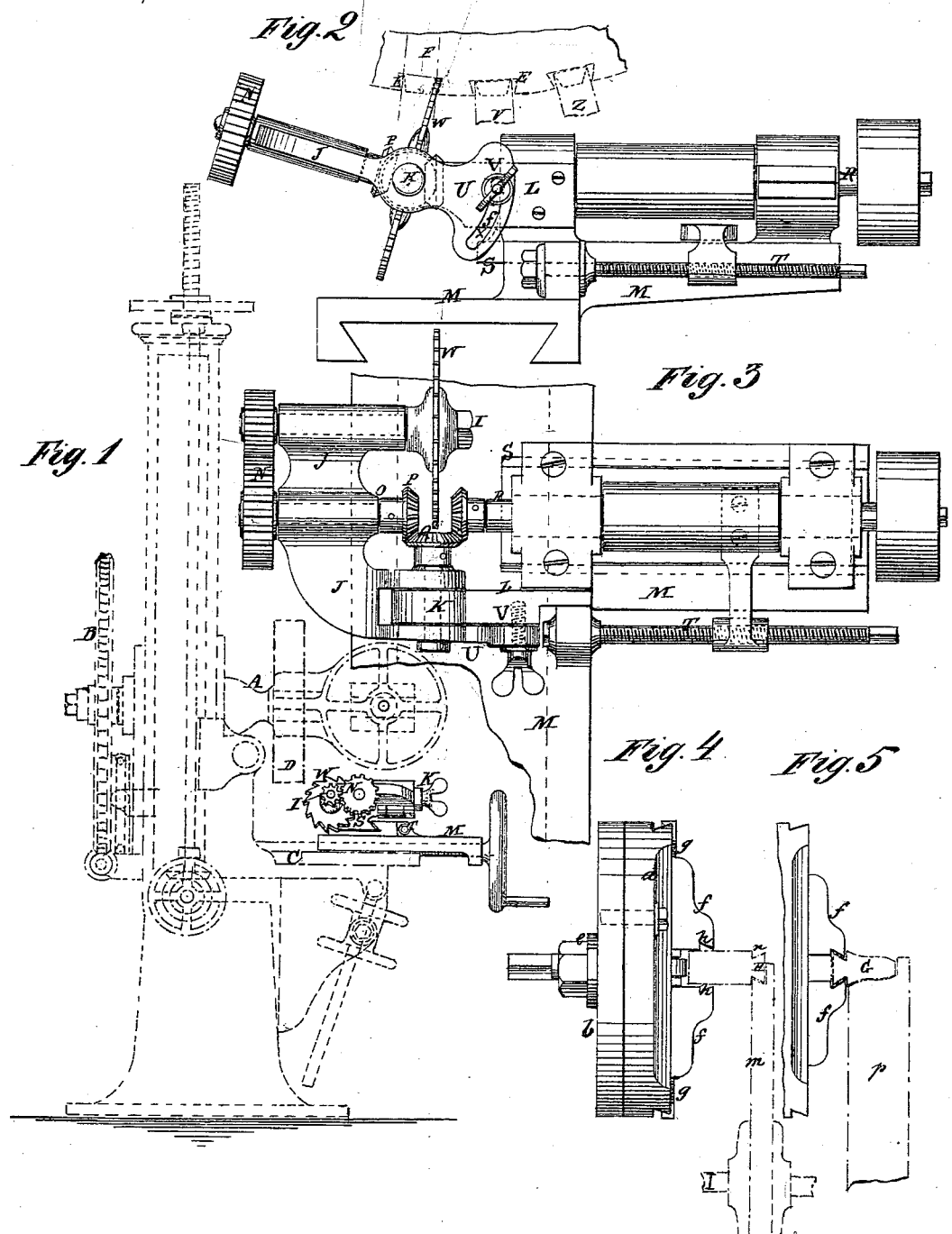
J. L. HEWES.
Machines for Making Gear-Wheel Patterns.
No. 148,884. Patented March 24, 1874.

No. 148,884. Patented March 24, 1874.

Witnesses:
A. W. Almqvist
Alex F. Roberts

Inventor:
J. L. Hewes
Per Munn & Co.
Attorneys.

UNITED STATES PATENT OFFICE.

JOSEPH L. HEWES, OF NEWARK, NEW JERSEY.

IMPROVEMENT IN MACHINES FOR MAKING GEAR-WHEEL PATTERNS.

Specification forming part of Letters Patent No. 148,884, dated March 24, 1874; application filed August 23, 1873.

*To all whom it may concern:*

Be it known that I, JOSEPH L. HEWES, of Newark, in the county of Essex and State of New Jersey, have invented a new and Improved Machine for Making Gear-Wheel Patterns, of which the following is a specification:

At the present time the pattern-cogs of the patterns used for molding cog-wheels are fitted into the runs by hand, by sawing and chiseling out dovetail grooves across the face of the pattern, making corresponding tenons on the blocks of which the teeth are to be formed, fitting in said blocks, and then dressing the blocks down to the finished shape.

Throughout the range of pattern-making, which is an art requiring the greatest skill in all its branches, there is perhaps no part of it more difficult and requiring more skill than this part of the making of a pattern-wheel, for the wheels made from the pattern will be unsatisfactory unless the teeth are exactly uniform in size, shape, &c., as is well known to all makers and users of machinery.

Now, I propose to do all the fitting of the rim and the teeth, and the finishing of the teeth, by mechanical devices, and thus not only secure the exact uniformity of shape and dimensions peculiar to the use of special tool for special work, but largely economize in time and labor as well. To this end I take an ordinary gear-cutting machine, or construct one in all respects like such a machine, and fit the wheel-rim to be fitted with teeth on the arbor whereon the wheels to have teeth cut in them are placed, to utilize the dividing apparatus for spacing the rim for the grooves; then, in place of the slide carrying the gear-cutter, I apply a slide having a saw capable of adjustment, so as to saw the face of the rim for dovetail grooves, and then with the same sawing apparatus, but with several different interchangeable cutters and an adjustable clamp-holder for holding the blocks of which the teeth are to be formed, mounted on the mandrel for holding the rim to have the grooves cut in it, said rim being removed, I fit the teeth with tenons for the grooves of the rim, and finish the teeth all exactly the same and very expeditiously, all as hereinafter described.

Figure 6:
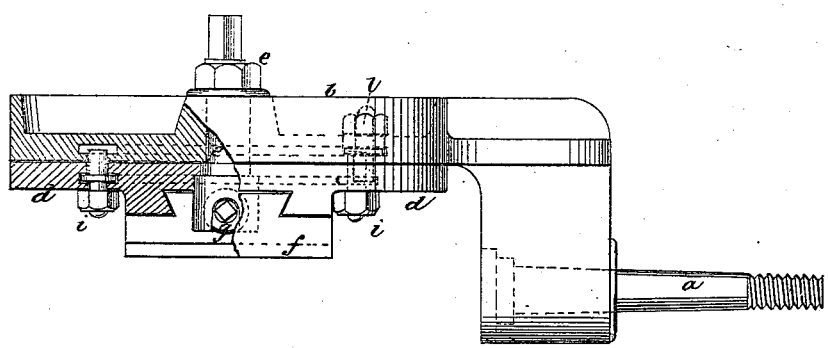
Figure 7:
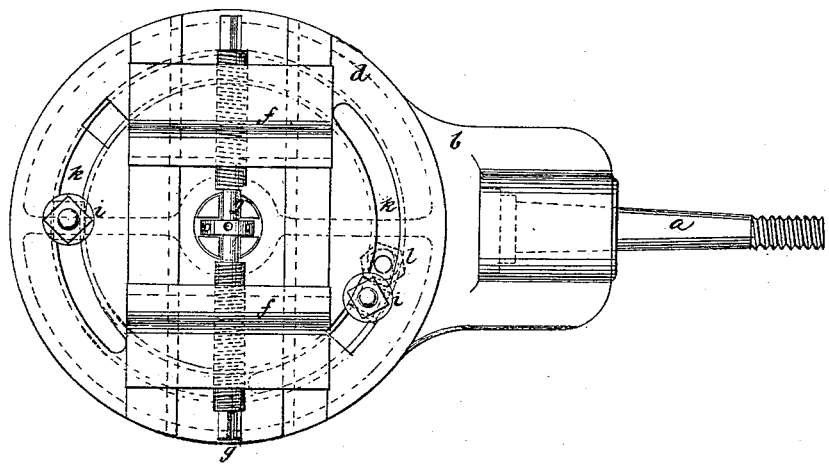

Figure 1 represents a side elevation, in dotted lines, of an ordinary gear-cutting machine, with my attachment for cutting the grooves in the wheel-rim in full lines, in place of the ordinary cutting-tool; it also shows a wheel-rim, in dotted lines, on the arbor to have the grooves for the cogs cut in it, and it also shows, in dotted lines, an elevation of the clamp-holder for holding the blocks of which the teeth are to be formed to be dressed. Fig. 2 is a front elevation of the apparatus for forming the grooves in the face of the wheel-rim; also, a side elevation of a portion of the rim of the pattern to be grooved. Fig. 3 is a plan view of the grooving apparatus represented in Fig. 2. Fig. 4 is a side elevation of the clamp-holder, showing a block clamped in it to have the dovetail tenon formed on it, and the tool for forming it in dotted lines. Fig. 5 represents a portion of the clamp-holder holding a tooth after the tenon has been formed to be finished; it also represents a portion of a finishing-cutter. Fig. 6 is partly a side elevation and partly a section of the clamp-holder, and Fig. 7 is a front elevation of the holder.

Similar letters of reference indicate corresponding parts.

A represents the mandrel of a gear-cutting engine, on which the wheel to be cut is placed. B represents the dividing-plate, and C represents the rest for the slide carrying the cutter, which, being revolved and fed up to the wheel, which, in this case, is represented by the dotted lines D, is operated, and the wheel D is shifted in all respects as in machines now in use for cutting teeth, and need not, therefore, be particularly described.

To cut the dovetail grooves E in the wheel-rim F, Fig. 2, to attach the cog-patterns G, Fig. 5, by corresponding tenons H, I have a saw or cutter mandrel, I, on an arm, J, which is jointed at K with a support, L, which is mounted on a cutter-slide, M, which is adapted to fit on the slide-rest C of the machine. This mandrel is geared by the wheel N with a shaft, O, which gears by wheel P with an idle-wheel, Q, which is in the axis of the joint K, and gears with the driving-shaft R, to which the belt for driving the saw or other cutter on the mandrel I is applied. The support L and the shaft R are on a slide, S, by which the cutter-mandrel and its driving-gear can be shifted transversely of the slide M by an adjusting-screw, T. The arm J has a slotted arm, U, working on a binding-screw, V, so that as the said cutter-mandrel supporting-arm is adjusted up or down to set the cutter oblique to undercut the walls of the grooves, as indicated in Fig. 2, it can be fastened at any point by said binding-screw. The axis of the joint K is in the plane of the saw W or other cutter, so that it can be turned either way alike for cutting both bevel walls of the grooves. The gearing of the cutter-mandrel with the driving-shaft by the idle-wheel in the axis of said joint allows of shifting the cutter either way, or to any angle, without interfering with the driving of the cutter. The ends of the slot X in the arm U limit the adjustment of the saw in both directions to exactly the same inclinations.

In forming the grooves in the wheel-rim F with this apparatus, the saw is set on the axis K by the arm U and clamp-screw V, to cut one of the walls of the grooves, and then adjusted laterally by the screw T to the right point for the required width of the groove, which may be indicated by a scale on the slide S, if necessary; the cuts are then made all round the pattern for that side of each groove; the saw is then changed to the opposite inclination, and again shifted by the slide S to the right position for the width of the grooves, and the other side of the grooves cut. If they are to be cut tapering, which is generally the case, so that the tenons will wedge in tightly, the rest C of the slide M will be shifted a little at one end—one way when cutting one side, and the other way when cutting the other side—in a manner that will be well understood. When both sides of the grooves are cut, the mandrel I is shifted to a horizontal plane, the saw removed, the rest C shifted back parallel to the mandrel A, and a wide cutter, Z, adapted to remove the wood between the cuts, is put on the saw-mandrel and run through the grooves, as indicated in Fig. 2, thus finishing the grooves. The saw W is intended to be thick enough to make kerfs so wide that the cutter Z will remove all of the wood remaining. The wheel-rim, having the grooves for the cogs thus formed in it, is removed, and the clamping-holder, Figs. 4, 6, and 7, for holding the blocks to be formed into teeth, is applied to the mandrel A, preferably by inserting its stem $a$ in a socket in the mandrel; but it may be attached in any approved way. This clamping-holder consists of a circular plate or frame, $b$, with a disk, $d$, fitted to its face by a center stud, $e$, on which it turns half-way round, and on this disk is a pair of clamping-jaws, $f$, and a right-and-left adjusting-screw for working them. These jaws have an undercut groove, $h$, in the face, exactly corresponding to the sides of the groove in the rim. The disk carrying the jaws $f$ has a couple of stops, $i$, fitted in curved slots $k$, in which they can be shifted forward and back. They are to arrest the disk by contact with another stud, $l$, in the plate $b$, when said disk is shifted forward and backward to change the blocks of which the teeth are formed to present both sides to the cutters. The said blocks are first clamped in the jaws, as represented in Fig. 4, and dressed, first on one side and then on the other, by a cutter, $m$, on mandrel I, in place of the saw W, to make the grooves $n$ for forming the tenon, and to make the latter the exact length required. The blocks are then reversed and clamped by the tenon in the grooves $h$ of the jaws, and held exactly the same as they will be when fitted in the grooves of the wheel and subjected to the finishing-cutter $p$, which is substituted for cutter $m$. This cutter finishes the sides and ends of the teeth, and, as a matter of course, makes them all exactly alike.

To cut the tenons of the teeth tapering, to correspond with the taper of the grooves in the rim, the stops $i$ are adjusted so that the disk $d$ will present the blocks properly to the cutters for the purpose—that is, a little more or a little less than half a circle—according to the relation of the wide and narrow ends of the tenon to the direction in which the disk is turned.

Bevel-wheel patterns can be made as well as spur-wheel patterns, the grooving attachment being adjusted by the adjusting slide-rest of the gear-cutter, the same as for adjusting the gear-cutting tool for cutting bevel-gears.

Having thus described my invention, I claim as new and desire to secure by Letters Patent—

1. The apparatus for grooving a wheel-rim pattern, consisting of a cutter-mandrel, I, mounted on an arm, J, jointed to a support, L, in the plane of the cutter, and geared at the axis of said joint with the driving-shaft mounted on support L, and said support L arranged for lateral adjustment on a slide, M, substantially as specified.

2. The clamping-holder consisting of the jaws $f$, having grooves $h$, and fitted together with an adjusting-screw, $z$, in a revolving disk, $d$, pivoted to a holding-plate, $b$, substantially as specified.

3. The combination of the cutting apparatus and the holding apparatus herein described, substantially as specified.

JOSEPH L. HEWES.

Witnesses:
 A. P. THAYER,
 ALEX. F. ROBERTS.